United States Patent
Mills et al.

(10) Patent No.: US 9,068,470 B2
(45) Date of Patent: Jun. 30, 2015

(54) INDEPENDENTLY-CONTROLLED GAS TURBINE INLET GUIDE VANES AND VARIABLE STATOR VANES

(75) Inventors: Jeffrey Patrick Mills, Greenville, SC (US); Jeffrey Mark Ruddy, Greenville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 1269 days.

(21) Appl. No.: 13/091,540

(22) Filed: Apr. 21, 2011

(65) Prior Publication Data

US 2012/0269613 A1    Oct. 25, 2012

(51) Int. Cl.
*F01D 17/26* (2006.01)
*F01D 17/16* (2006.01)
*F02C 7/057* (2006.01)

(52) U.S. Cl.
CPC .............. *F01D 17/162* (2013.01); *F02C 7/057* (2013.01); *F05D 2240/12* (2013.01); *F05D 2260/406* (2013.01)

(58) Field of Classification Search
CPC .............. F01D 1/02; F01D 1/04; F01D 1/10; F01D 1/18; F01D 1/20; F01D 17/00; F01D 17/12; F01D 17/14; F01D 17/141; F01D 17/145; F01D 17/16; F01D 17/162; F01D 17/26
USPC ........... 415/148, 149.2, 155, 160, 162, 209.1, 415/208.2, 208.1, 193
See application file for complete search history.

(56) References Cited

U.S. PATENT DOCUMENTS

| | | | | |
|---|---|---|---|---|
| 2,780,064 A | * | 2/1957 | Sharp et al. | 60/415 |
| 2,931,168 A | * | 4/1960 | Nordwald et al. | 60/238 |
| 3,914,066 A | * | 10/1975 | Downing | 415/151 |
| 3,973,391 A | | 8/1976 | Reed et al. | |

(Continued)

FOREIGN PATENT DOCUMENTS

EP        1 724 472        11/2006

OTHER PUBLICATIONS

Chinese Office Action dated Nov. 15, 2014 issued in Chinese Patent Application No. 201210138743.6 and English translation, 10 pp.

*Primary Examiner* — Edward Look
*Assistant Examiner* — Danielle M Christensen
(74) *Attorney, Agent, or Firm* — Nixon & Vanderhye P.C.

(57) ABSTRACT

A system adjusts positions of gas turbine inlet guide vanes (IGVs) and variable stator vanes (VSVs). The system includes a hydraulic power unit providing a supply of hydraulic fluid, an IGV servo in fluid communication with the hydraulic power unit, and a VSV servo in fluid communication with the hydraulic power unit. An IGV cylinder set is provided in fluid communication with the hydraulic power unit via the IGV servo and is connected to the IGVs. The IGV cylinder set effects displacement of the IGVs between a closed position and a fully open position. A VSV cylinder set is provided in fluid communication with the hydraulic power unit via the VSV servo. The VSVs include multiple stages linked together with a torque shaft. The VSV cylinder set is connected to the torque shaft, and the VSV cylinder set effects simultaneous displacement of the stages of the VSVs between a closed position and a fully open position. The IGV servo and the VSV servo respectively control delivery of hydraulic fluid from the hydraulic power unit to the IGV cylinder set and the VSV cylinder set, and the IGV servo and the VSV servo are independently controllable.

15 Claims, 6 Drawing Sheets

(56) References Cited

U.S. PATENT DOCUMENTS

| | | |
|---|---|---|
| 4,812,106 A | 3/1989 | Purgavie |
| 5,044,879 A * | 9/1991 | Farrar .......................... 415/150 |
| 5,102,049 A | 4/1992 | Ward |
| 5,622,473 A | 4/1997 | Payling |
| 5,807,072 A | 9/1998 | Payling |
| 6,209,198 B1 | 4/2001 | Lammas et al. |
| 6,226,974 B1 | 5/2001 | Andrew et al. |
| 6,758,044 B2 | 7/2004 | Mannarino |
| 6,794,766 B2 | 9/2004 | Wickert et al. |
| 7,096,657 B2 * | 8/2006 | Mahoney et al. ............ 60/39.25 |
| 7,125,222 B2 | 10/2006 | Cormier et al. |
| 7,182,571 B2 | 2/2007 | Selby |
| 7,198,454 B2 | 4/2007 | Evans |
| 7,220,098 B2 | 5/2007 | Bruce et al. |
| 7,278,819 B2 | 10/2007 | Schilling |
| 7,344,355 B2 | 3/2008 | Wilshaw |
| 7,413,401 B2 | 8/2008 | Szucs et al. |
| 7,445,427 B2 | 11/2008 | Gutknecht et al. |
| 8,152,406 B1 * | 4/2012 | Al-Qahtani ....................... 404/6 |
| 2005/0147492 A1 | 7/2005 | Mahoney et al. |

* cited by examiner

INDEPENDENTLY-CONTROLLED GAS TURBINE INLET GUIDE VANES AND VARIABLE STATOR VANES

BACKGROUND OF THE INVENTION

The invention relates generally to gas turbines and, more specifically, to variable stator vane assemblies used with gas turbines.

In a gas turbine, air is pressurized in a compressor and channeled to a combustor where it is mixed with fuel and ignited for generating hot combustion gases. The hot combustion gases flow downstream into one or more turbine stages, which extract energy therefrom for producing useful work. At least some known compressors have a plurality of axial stages that compress the air in turn as it flows downstream. Each compressor stage may include a row of rotor blades extending radially outwardly from a compressor spool or disk, and a cooperating row of stator vanes extending radially inwardly from an annular casing.

It would be desirable to enable independent hydraulic actuation of compressor inlet guide vanes (IGVs) and variable stator vanes (VSVs) for improved gas turbine efficiency, performance and load turndown capability. Vane angle settings between the two separate sets of vanes may be independently adjustable to allow the gas turbine compressor to operate more effectively. It would further be desirable to include trip functionality to provide compressor protection during emergency shutdown situations.

BRIEF DESCRIPTION OF THE INVENTION

In an exemplary embodiment, a system adjusts positions of gas turbine inlet guide vanes (IGVs) and variable stator vanes (VSVs). The system includes a hydraulic power unit providing a supply of hydraulic fluid, an IGV servo in fluid communication with the hydraulic power unit, and a VSV servo in fluid communication with the hydraulic power unit. An IGV cylinder set is provided in fluid communication with the hydraulic power unit via the IGV servo and is connected to the IGVs. The IGV cylinder set effects displacement of the IGVs between a closed position and a fully open position. A VSV cylinder set is provided in fluid communication with the hydraulic power unit via the VSV servo. The VSVs include multiple stages linked together with a torque shaft. The VSV cylinder set is connected to the torque shaft, and the VSV cylinder set effects simultaneous displacement of the stages of the VSVs between a closed position and a fully open position. The IGV servo and the VSV servo respectively control delivery of hydraulic fluid from the hydraulic power unit to the IGV cylinder set and the VSV cylinder set, and the IGV servo and the VSV servo are independently controllable.

In another exemplary embodiment, a gas turbine includes a compressor receiving inlet air and mixing the inlet air with fuel, a combustor that receives the inlet air and fuel mixture and that combusts the mixture to produce hot products of combustion, and a turbine receiving the hot products of combustion and converting the hot products of combustion into work. The compressor includes inlet guide vanes (IGVs) and variable stator vanes (VSVs), where respective positions of the IGVs and the VSVs affect a performance efficiency of the gas turbine. The compressor includes the noted system for adjusting the positions of the IGVs and the VSVs.

In yet another exemplary embodiment, a method of adjusting positions of gas turbine inlet guide vanes (IGVs) and variable stator vanes (VSVs) includes the steps of providing a supply of hydraulic fluid with a hydraulic power unit; connecting an IGV servo in fluid communication with the hydraulic power unit; connecting a VSV servo in fluid communication with the hydraulic power unit; displacing the IGVs between a closed position and a fully open position with an IGV cylinder set in fluid communication with the hydraulic power unit via the IGV servo; and displacing the VSVs between a closed position and a fully open position with a VSV cylinder set in fluid communication with the hydraulic power unit via the VSV servo, the VSVs including multiple stages linked together with a torque shaft, wherein VSV cylinder set is connected to the torque shaft, the step of displacing the VSVs comprising simultaneously displacing the stages of the VSVs via the torque shaft. The IGV servo and the VSV servo respectively control delivery of hydraulic fluid from the hydraulic power unit to the IGV cylinder set and the VSV cylinder set, and the IGV servo and the VSV servo are independently controllable.

DETAILED DESCRIPTION OF THE INVENTION

Figure 1:
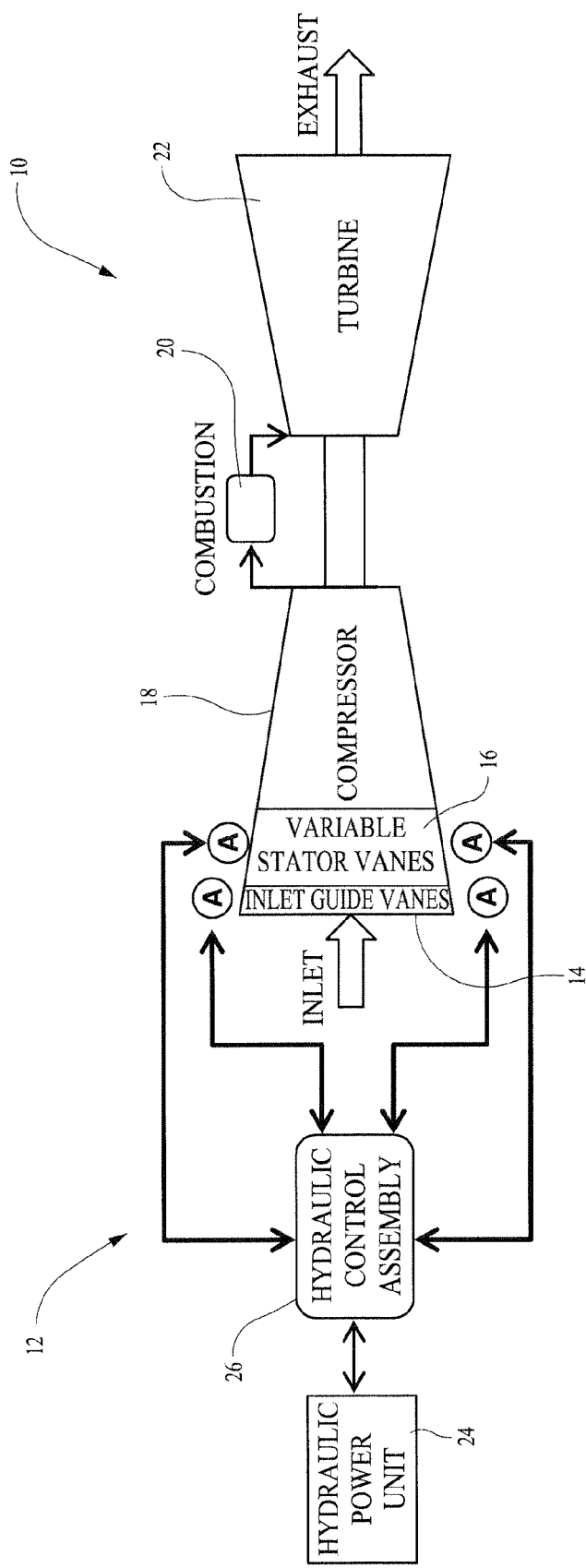
FIG. 1 is a schematic block diagram of a gas turbine including an IGV/VSV actuation system.

FIG. 1 is a schematic block diagram of a gas turbine 10 including a hydraulic actuation system 12 for independently controlling gas turbine compressor inlet guide vanes (IGVs) 14 and variable stator vanes (VSVs) 16. In a gas turbine, air is pressurized in a compressor and mixed with fuel and ignited in a combustor 20 producing hot combustion gases. The hot combustion gases flow downstream into a turbine 22 including one or more turbine stages that extract energy from the hot combustion gases to produce useful work.

It is desirable to control air flow into the compressor by adjusting positions of the IGVs 14 and the VSVs 16. The actuation system 12 provides for independently-controllable IGVs 14 and VSVs 16 via hydraulic actuators connected to a hydraulic power unit 24 and controlled by a hydraulic control assembly 26.

Figure 2:
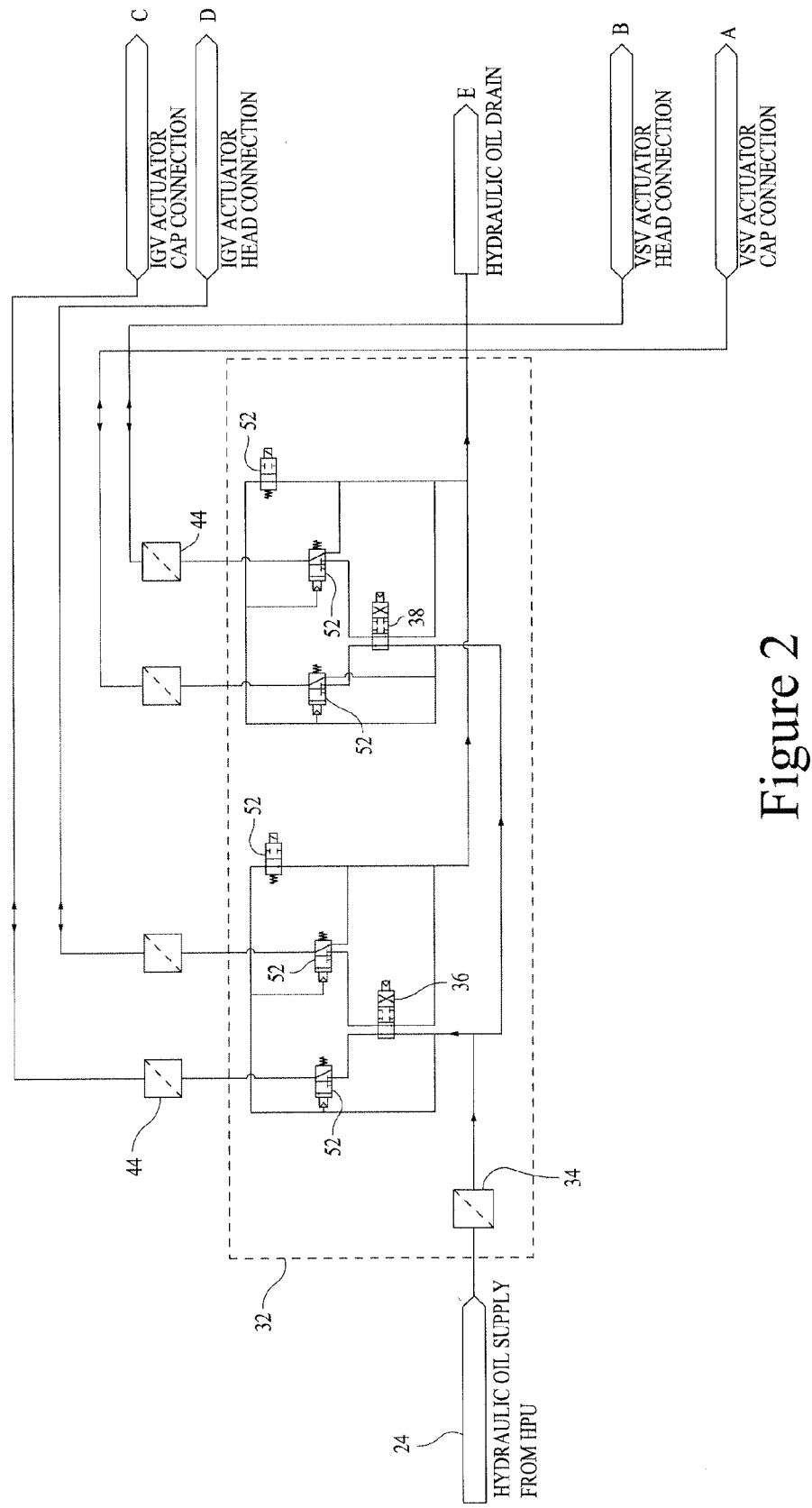
FIGS. 2 and 3 show a hydraulic circuit diagram of the actuation system.
Figure 3:
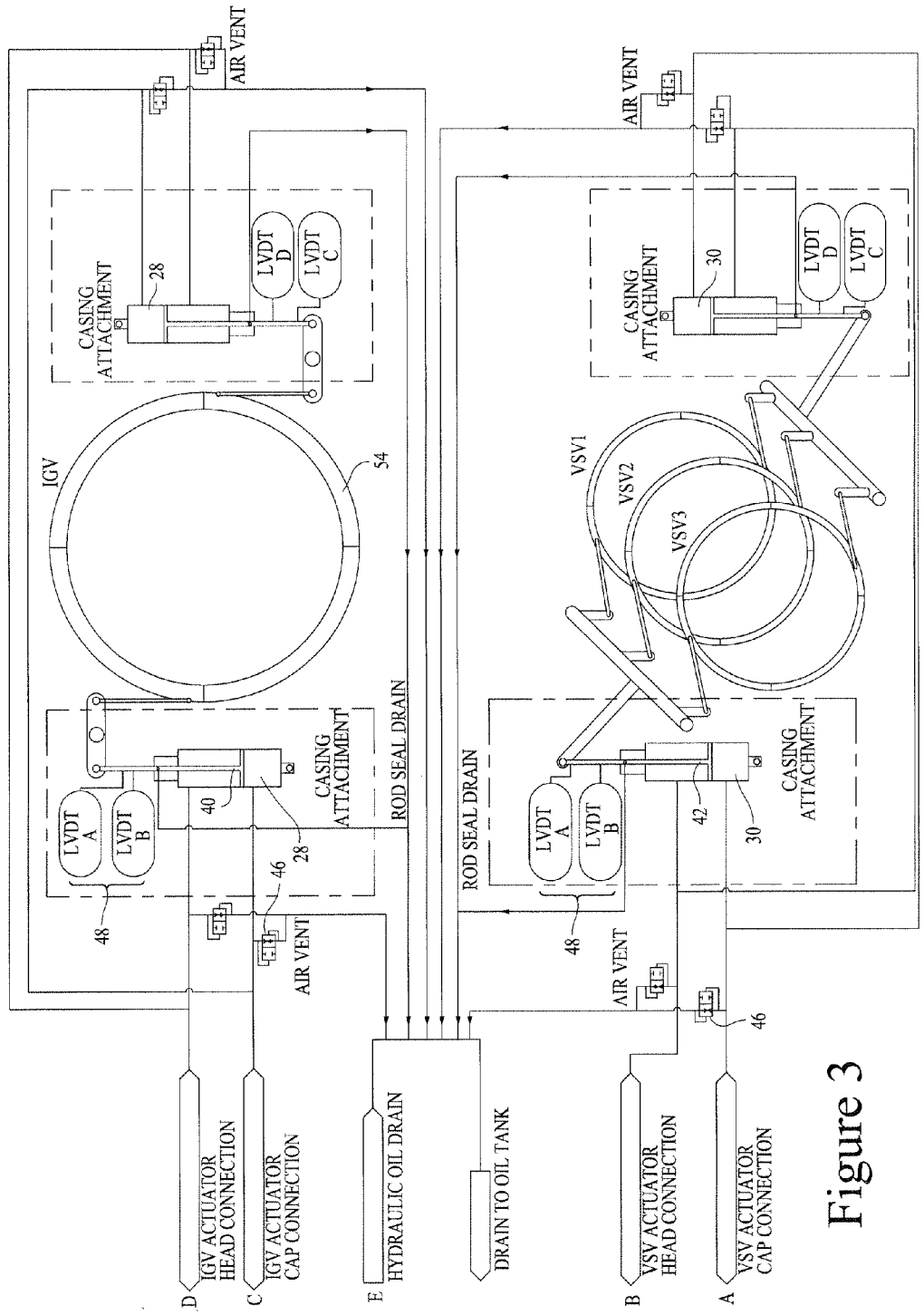

FIGS. 2 and 3 show a hydraulic circuit diagram of the actuation system 12. Generally, hydraulic fluid at a nominal pressure is provided from a reservoir in the hydraulic power unit 24. Hydraulic fluid is provided to IGV actuators or cylinders 28 and VSV actuators or cylinders 30 under the control of the hydraulic control assembly 26. As shown, two cylinders 28, 30 are associated with each of the IGVs and the VSVs, one each corresponding to each side of the unit. The cylinders 28, 30 are controlled to control respective positions of the IGVs 14 and the VSVs 16 between a closed position restricting air flow and a fully opened position permitting maximum air flow.

The hydraulic fluid supply from the hydraulic power unit 24 is piped to a manifold 32 that splits the supply stream between the IGV and the VSV portions of the actuation system 12. A filter 34 serves to filter the fluid upon entry in the manifold 32 to protect downstream valves from potential debris and the like.

Fluid flow to the cylinders 28, 30 is controlled by an IGV servo valve 36 for the IGVs and a VSV servo valve 38 for the VSVs. Although controlled by a single source, the IGV servo 36 and the VSV servo 38 respectively control delivery of hydraulic fluid from the hydraulic power unit 24 to the IGV cylinders 28 and the VSV cylinders 30 and are independently controllable.

The servo valves 36, 38 act to port the fluid supply to either the head or cap end of the cylinders 28, to produce either a "retract" or "extend" motion of the actuator rods 40, 42. In a preferred construction, retracting the rods 40, 42 corresponds to opening the vanes 14, 16, and extending the rods 40, 42 corresponds to closing the vanes 14, 16. Hydraulic fluid is ported away from the non-supply side of the actuators 28, 30, either head or cap side depending on intended motion, back to the control module 26. The control module 26 communicates with the main gas turbine control system and ports fluid accordingly to reach and/or maintain desired vane positions for the IGVs and the VSVs. In an exemplary construction, exhaust temperature can be measured as an indication of turbine operation/efficiency. Positions of the IGVs 14 and the VSVs 16 may be adjusted according to the exhaust temperature to improve gas turbine output.

The circuit includes inline screens 44 between the servos 36, 38 and the cylinders 28, 30. The inline screens 44 serve to prevent debris from getting into the servo valves 36, 38, particularly as hydraulic fluid is returned to the servos 36, 38 from the cylinders 28, 30.

An air bleed 46 enables air to be removed from the system at high points. Preferably, the air bleed 46 comprises a manual valve or button that requires operator actuation during maintenance or shut down operations.

Figure 4:
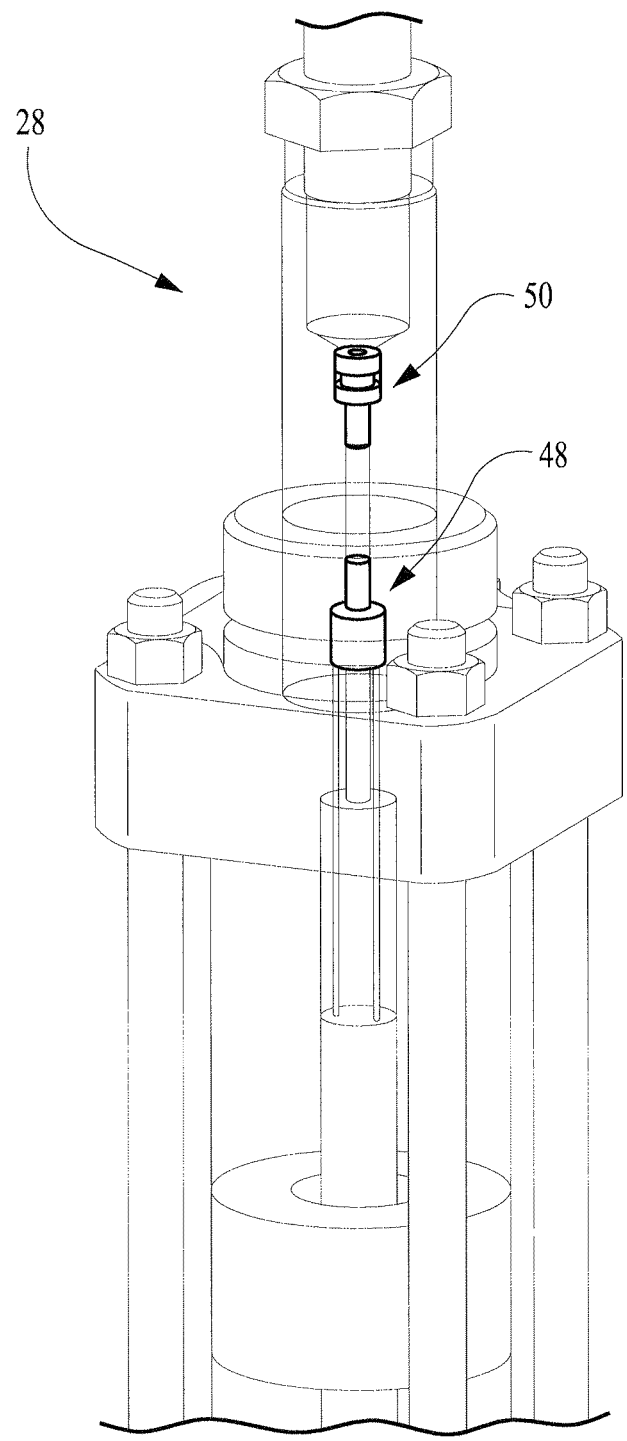
FIG. 4 shows an exemplary actuator and internal components.

Position feedback for the vanes 14, 16 is measured and relayed back to the gas turbine control system via linear variable differential transformers (LVDTs) 48 internal to the cylinders 28, 30. FIG. 4 shows an exemplary IGV actuator showing the internal LVDTs 48. In a preferred construction, each actuator is provided with two independent LVDTs 48. A rod end plug 50 seals the LVDTs 48 and prevents field adjustment.

With continued reference to FIGS. 2 and 3, each of the IGV side and the VSV side of the hydraulic circuit includes trip valves 52 that are used to port the hydraulic fluid to one side of each cylinder 28, 30, forcing it into a position in which the IGVs 14 and the VSVs 16 are closed. In a preferred construction, the trip valves 52 force the cylinders 28, 30 into their extended position. When a trip signal is relayed to the control module, the system bypasses the servos 36, 38 and ports fluid through the trip valves 52 directly to the cap end of each cylinder 28, 30. Trip commands are used during gas turbine emergency shut down, which could be caused by various factors internal or external to the IGV/VSV system. This trip functionality provides compressor protection during emergency shut down situations to limit airflow and prevent the unit from dangerous over-speed events. Additionally, in a preferred construction, the trip valves are configured such that the IGVs always lead the VSVs to close, thereby preventing a compressor stall or surge event.

Figure 5:
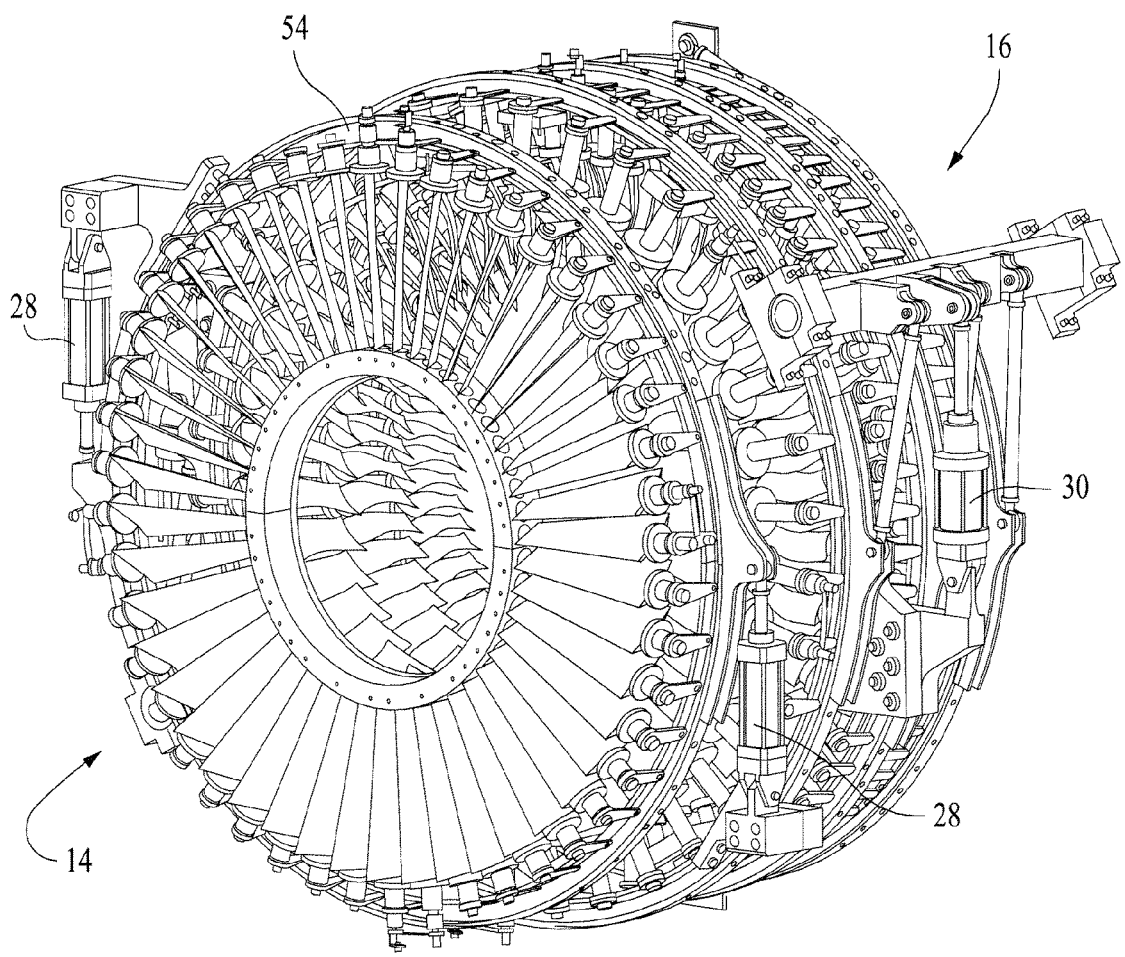
FIG. 5 is a perspective view of one side of a compressor section showing the cylinder and vane sets.
Figure 6:
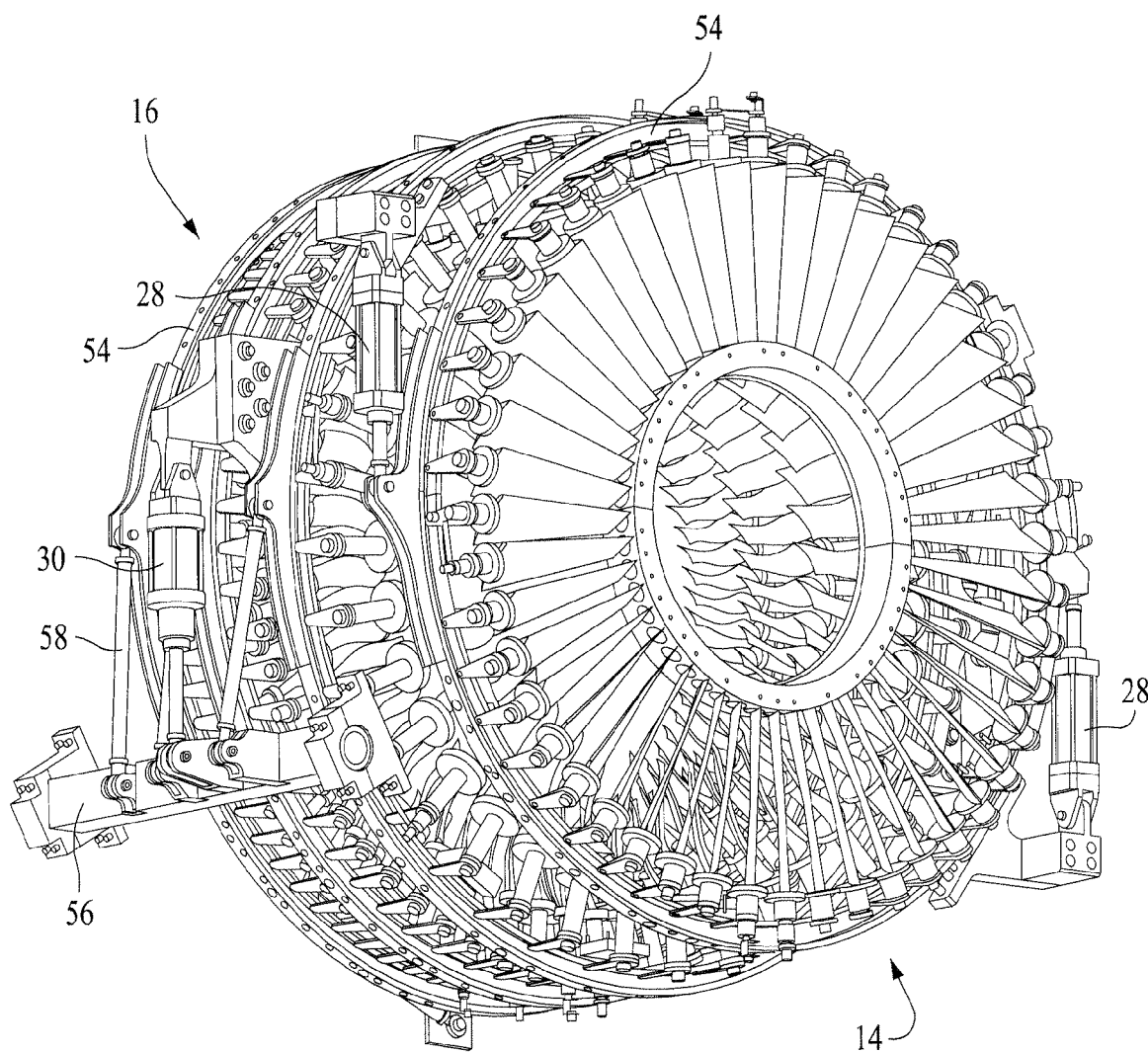
FIG. 6 is a perspective view of an opposite side of the compressor section showing the cylinder and vane sets.

FIGS. 5 and 6 are perspective views of right and left side sections of the compressor showing the IGVs and the VSVs 16. As shown, there are two actuators/cylinders 28, 30 for each of the IGVs 14 and the VSVs 16, one on each side. The IGVs 14 are connected to a unison ring 54 attached to a vane pin (inside the c-channel part of the unison ring). The unison ring 54 moves the vanes 14 in tandem, and the IGV cylinders 28 act on the unison ring 54. As shown, the IGVs 14 comprise a single stage of variable vanes closest to the air inlet of the gas turbine compressor.

The VSVs 16 comprise multi-stage variable vanes in this instance with three individual stages linked together with a mechanical shaft or torque shaft 56. Rods 58 are connected to the torque shaft 56 at one end and are connected at an opposite end to unison rings 54 of each of the VSV stages. The VSV cylinders 30 act on the torque shaft 56.

The described embodiments enable hydraulic actuation of separate sets of variable vanes independently for improved gas turbine efficiency, performance and load turn down capability. Independently controllable vane angle settings between two separate sets of vanes allow the gas turbine compressor to operate more effectively. Also, the trip functionality provides compressor protection during emergency shut down situations. Packaging a pair of servo and trip valves together with a hydraulic manifold with a single supply and a single drain connection allows for a smaller installed footprint.

The described embodiments provide a simple interface to the field installed hydraulic interconnect piping to and from the reservoir. Since the actuators are mounted to the gas turbine casings, the IGV/VSV system hardware can be shipped installed on the gas turbine, thereby reducing installation time and more easily maintaining cleanliness of the hydraulic components.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A system for adjusting positions of gas turbine inlet guide vanes (IGVs) including a first set of vanes and variable stator vanes (VSVs) including a second set of vanes, the system comprising:

a hydraulic power unit providing a supply of hydraulic fluid;

an IGV servo in fluid communication with the hydraulic power unit;

a VSV servo in fluid communication with the hydraulic power unit;

an IGV cylinder set in fluid communication with the hydraulic power unit via the IGV servo and connected to the IGVs, the IGV cylinder set effecting tandem displacement of the first set of vanes between a closed position and a fully open position;

a VSV cylinder set in fluid communication with the hydraulic power unit via the VSV servo, the VSV cylinder set being separate and independent from the IGV cylinder set, the VSVs including the second set of vanes across multiple stages linked together with a torque shaft, wherein VSV cylinder set is connected to the torque shaft, and wherein the VSV cylinder set effects simultaneous displacement of the stages of the VSVs between a closed position and a fully open position, wherein the IGV servo and the VSV servo respectively control delivery of hydraulic fluid from the hydraulic power unit to the IGV cylinder set and the VSV cylinder set, and wherein the IGV servo and the VSV servo are independently controllable; and trip valves cooperable with each of the IGV servo and the VSV servo, each of the trip valves being activated to bypass the IGV and VSV servos, respectively, and close the IGVs and the VSVs.

2. A system according to claim 1, wherein the IGV cylinder set comprises a first IGV cylinder for one side of the IGVs and a second IGV cylinder for an opposite side of the IGVs, and wherein the VSV cylinder set comprises a first VSV cylinder for one side of the VSVs and a second VSV cylinder for an opposite side of the VSVs, the hydraulic fluid being equally delivered to the first and second IGV cylinders, and equally to the first and second VSV cylinders.

3. A system according to claim 1, further comprising a position detecting assembly producing a signal representative of a position of the IGVs and the VSVs.

4. A system according to claim 3, wherein the position detecting assembly comprises a linear variable differential transformer (LVDT) internally positioned in each of the IGV cylinder set and the VSV cylinder set, the LVDTs measuring a length of the respective cylinder sets.

5. A system according to claim 1, further comprising a manifold interposed between the hydraulic power unit and the IGV and VSV servos, the manifold distributing hydraulic fluid to the IGV and VSV servos.

6. A system according to claim 1, further comprising a temperature sensor measuring an exhaust temperature of the gas turbine, wherein the positions of the IGVs and the VSVs are adjusted according to the exhaust temperature.

7. A system according to claim 1, further comprising filters positioned between the IGV servo and the IGV cylinder set and between the VSV servo and the VSV cylinder set.

8. A system according to claim 1, further comprising a filter positioned between the hydraulic power unit and the IGV and VSV servos.

9. A system according to claim 1, wherein the IGV cylinder set and the VSV cylinder set are biased toward an extended position corresponding to the closed position of the IGVs and the VSVs, and wherein the trip valves are configured such that activation of the trip valves drains the hydraulic fluid from the IGV cylinder set and the VSV cylinder set, thereby closing the IGVs and the VSVs.

10. A gas turbine comprising:
a compressor receiving inlet air and mixing the inlet air with fuel;
a combustor that receives the inlet air and fuel mixture and that combusts the mixture to produce hot products of combustion; and
a turbine receiving the hot products of combustion and converting the hot products of combustion into work,
the compressor including a set of inlet guide vanes (IGVs) and a set of variable stator vanes (VSVs), wherein respective positions of the IGVs and the VSVs affect a performance efficiency of the gas turbine, and the compressor including a system for adjusting the positions of the set of IGVs and the set of VSVs, the system includes:
a hydraulic power unit providing a supply of hydraulic fluid,
an IGV servo in fluid communication with the hydraulic power unit,
a VSV servo in fluid communication with the hydraulic power unit,
an IGV cylinder set in fluid communication with the hydraulic power unit via the IGV servo and connected to the IGVs, the IGV cylinder set effecting tandem displacement of the IGVs between a closed position and a fully open position,
a VSV cylinder set in fluid communication with the hydraulic power unit via the VSV servo, the VSV cylinder set being separate and independent from the IGV cylinder set, the VSVs including the second set of vanes across multiple stages linked together with a torque shaft, wherein VSV cylinder set is connected to the torque shaft, and wherein the VSV cylinder set effects simultaneous displacement of the stages of the VSVs between a closed position and a fully open position,
wherein the IGV servo and the VSV servo respectively control delivery of hydraulic fluid from the hydraulic power unit to the IGV cylinder set and the VSV cylinder set, and wherein the IGV servo and the VSV servo are independently controllable, and
trip valves cooperable with each of the IGV servo and the VSV servo, each of the trip valves being activated to bypass the IGV and VSV servos, respectively, and close the IGVs and the VSVs.

11. A gas turbine according to claim 10, wherein the IGV cylinder set comprises a first IGV cylinder for one side of the IGVs and a second IGV cylinder for an opposite side of the IGVs, and wherein the VSV cylinder set comprises a first VSV cylinder for one side of the VSVs and a second VSV cylinder for an opposite side of the VSVs, the hydraulic fluid being equally delivered to the first and second IGV cylinders, and equally to the first and second VSV cylinders.

12. A gas turbine according to claim 10, further comprising a position detecting assembly producing a signal representative of a position of the IGVs and the VSVs.

13. A gas turbine according to claim 12, wherein the position detecting assembly comprises a linear variable differential transformer (LVDT) internally positioned in each of the IGV cylinder set and the VSV cylinder set, the LVDTs measuring a length of the respective cylinder sets.

14. A gas turbine according to claim 10, further comprising a temperature sensor measuring an exhaust temperature of the gas turbine, wherein the positions of the IGVs and the VSVs are adjusted according to the exhaust temperature.

15. A gas turbine according to claim 10, wherein the IGV cylinder set and the VSV cylinder set are biased toward an extended position corresponding to the closed position of the IGVs and the VSVs, and wherein the trip valves are configured such that activation of the trip valves drains the hydraulic fluid from the IGV cylinder set and the VSV cylinder set, thereby closing the IGVs and the VSVs.

* * * * *

UNITED STATES PATENT AND TRADEMARK OFFICE
CERTIFICATE OF CORRECTION

PATENT NO.         : 9,068,470 B2  
APPLICATION NO.    : 13/091540  
DATED              : June 30, 2015  
INVENTOR(S)        : Mills et al.

Page 1 of 1

It is certified that error appears in the above-identified patent and that said Letters Patent is hereby corrected as shown below:

In the specification

At column 2, line 39, insert --18-- after "in a compressor"

At column 3, line 9, insert --30-- after "28,"

At column 3, line 62, insert --14-- after "the IGVs"

Signed and Sealed this  
Tenth Day of November, 2015

Michelle K. Lee  
*Director of the United States Patent and Trademark Office*